United States Patent Office 3,642,955
Patented Feb. 15, 1972

3,642,955
DYEABLE POLYPROPYLENE FIBERS
David E. O'Connor, Cincinnati, Ohio, assignor to Ciba-Geigy Corporation, Greenburgh, N.Y.
No Drawing. Filed Aug. 1, 1969, Ser. No. 846,914
Int. Cl. C08f 29/12, 33/08, 7/12
U.S. Cl. 260—895
4 Claims

ABSTRACT OF THE DISCLOSURE

Dyeability of polypropylene is substantially improved by blending with the polyolefin a copolymer of 2-methyl-5-vinyl pyridine and vinyl acetate or vinyl alcohol. The amount of the pyridine copolymers employed may range from 1 to 15 percent by weight.

BACKGROUND OF THE INVENTION

Polypropylene possesses many desirable properties, such as good mechanical properties and light weight, to make it attractive in the production of fibers and films. However, it is well known that polypropylene and fibers or films made therefrom generally possess poor affinity for dyes. Thus, in order to make polypropylene useful as a fiber material, it is necessary to improve its dyeability. Various different methods are known to improve the dye affinity to polypropylene and fibers thereof. An example of one such method is to incorporate in polypropylene various chemicals. In this respect, U.S. Pat. No. 3,315,014 discloses blending polypropylene with vinyl pyridine homopolymers or copolymers with N-substituted acrylamides. U.S. Pat. No. 3,361,843 discloses employing vinyl pyridine copolymerized with various acrylamide monomers and the U.S. Pat. No. 3,156,014 discloses employing vinyl pyridine copolymerized with various acrylates and methacrylates as dyesite materials to be incorporated into polypropylene. Although mixtures of polypropylene with said polymers improve the dye affinity of the resulting fibers, the improvements are often not satisfactory. It is therefore the object of this invention to produce polypropylene blends which possess superior dyeability.

DETAILED DESCRIPTION OF THE INVENTION

Polypropylene blended with a copolymer of 2-vinyl or 4-vinyl pyridine or 2-methyl-5-vinyl pyridine and vinyl acetate or vinyl alcohol possesses good dyeability properties. Thus, this invention covers a novel composition comprising from about 85 to about 99 percent by weight of polypropylene and from 1 to about 15 percent by weight of one of the above-mentioned copolymers. The preferred composition contains from about 3 to about 10 percent by weight of the copolymer and a corresponding amount of polypropylene. The copolymers are composed of from 50 to 95 percent by weight of vinyl pyridine or 2-methyl-5-vinyl pyridine and of from 5 to 50 percent by weight of vinyl alcohol or vinyl acetate.

The copolymers of this invention can be prepared by any known method, such as by solution polymerization or emulsion polymerizataion either in the presence or absence of a chain transfer agent. Illustrative examples of the methods of preparation of said polymers are given below.

When the polymers described above are incorporated into polypropylene, the resulting compositions possess significantly improved dyeability properties, with respect to acid, and premetallized and especially disperse dyes.

Illustrative examples of dyestuffs which can be used to dye polypropylene containing a copolymer of this invention are listed below:

Irgalan Red 4 GL:
  2:1 chromium complex of

[structure: phenyl-$C_2H_5SO_2$ substituted with $-N=N-C(-C-CH_3)=N-HO-N-$ and N-phenyl triazole]

Setacyl Brilliant Red P-BLN:

[anthraquinone structure with $NH_2$ and $-OCH_2CH_2OH$ substituents, and $OH$]

Setacyl Scarlet P-GBL:

[structure: $O_2N-$phenyl$-N=N-$(Cl-substituted phenyl)$-N(C_2H_5)(C_2H_4CN)$]

Setacyl Yellow GLF:

[structure: phenyl$-NH-$($O_2N$-phenyl)$-SO_2NH_2$]

Polar Red RS:

[structure: naphthalene with OH, $NaO_3S-$, $-SO_3Na$, $-N=N-$phenyl(CH$_3$)-phenyl(H$_3$C)$-N=N-$naphthol]

Setacyl Printing Blue BB:

[anthraquinone structure with four $NH_2$ groups]

In addition to the dyesite polymer, polypropylene can also contain additives that are normally employed depending on the end use of the product. Such additives can be antioxidants, ultraviolet light stabilizers, pigments, lubricants, synergists, and the like. Illustrative examples of antioxidants are:

di-n-octadecyl-(3-t-butyl-4-hydroxy-5-methyl-benzyl)malonate
2,6-di-t-butylphenol
2,2'-methylene-bis(6-t-butyl-4-methylphenol)
2,6-di-t-butylhydroquinone
4,4'-thiobis(2-t-butyl-5-methylphenol)
dodecyl-(3,5-di-t-butyl-4-hydroxybenzylthio)propionate
1,1,3-tris(3,5-dimethyl-4-hydroxyphenyl)propane
1,4-di-(3,5-di-t-butyl-4-hydroxybenzyl)-2,3,5,6-tetramethylbenzene
dioctadecyl 3,5-di-t-butyl-4-hydroxybenzylphosphonate
octadecyl β-(3,5-di-t-butyl-4-hydroxybenzyl)propionate tetra-[3-(3′,5′-di-t-butyl-4′-hydroxyphenyl)propionyl-
  oxymethyl]methane
2,4-bis-(4-hydroxy-3,5-di-t-butylphenoxy)-6-(n-
  octylthioethylthio)-1,3,5-triazine
2,4-bis-(3,5-di-t-butyl-4-hydroxyphenoxy)-6-(n-
  octylthio)-1,3,5-triazine
2,4-bis-(n-octylthio)-6-(3,5-di-t-butyl-4-hydroxyanilino)-
  1,3,5-triazine
n-octadecyl 3,5-di-t-butyl-4-hydroxybenzoate
and the like.

Illustrative examples of ultraviolet light absorbers are:

2-hydroxy-4-methoxybenzophenone
[2,2′-thiobis(4-t-octylphenolato)]-n-butylamino nickel II
2,4-dibenzoyl resorcinol
2,4-dihydroxybenzophenone
hexamethylphosphoric triamide
nickel bisoctyl phenyl sulfide
2,2′-dihydroxy-4,4′-dimethoxybenzophenone
ethyl-2-cyano-3,3-diphenyl acrylate
2(2′-hydroxy-5′-methylphenyl)-benzotriazole
substituted 2(2′-hydroxyphenyl)-benzotriazole
2(2′-hydroxy-3′,5′-di-t-butylphenyl)-7-chlorobenzo-
  triazole
and the like.

Illustrative examples of synergists are:

dilaurylthiodipropionate
distearylthiodipropionate
tris-nonyl-phenylphosphite
trilauryl-trithiophosphite
and the like.

The following examples are presented to further illustrate the invention and should not be considered as a limitation thereof.

EXAMPLE 1

Preparation of 2-methyl-5-vinylpyridine (MVP)/vinyl acetate (VAc) copolymer

To a stirred solution of 7.0 g. of nonylphenoxypoly-(ethylenoxy)ethanol (Igepal CO710), 7.0 g. of sodium lauryl sulfate (Dupanol ME), and 1.5 g. of potassium persulfate in 350 ml. water at 65° C. was added a mixture of 75 g. of MVP and 75 g. of VAc. One-third of this mixture was added at once and the remaining two-thirds were added dropwise over a two hour period. Two hours after the addition was complete, an additional 0.5 g. of potassium persulfate was added and the reaction was continued overnight at 65°. The polymer was precipitated by the addition of sodium chloride. It was redissolved in methanol, precipitated in diethyl ether and dried at 60° under vacuum. Elemental analysis of the polymer indicated that it contained 9.73% nitrogen, which corresponds to a composition of 82 percent by weight of MVP. The yield of the polymer was 48 g. (32%).

Following the procedure of Example 1, additional copolymers as reported in Table I were prepared.

TABLE I

[2-methyl-5-vinylpyridine (MVP)/vinyl acetate (VAc) copolymers]

| Feed composition, grams | | Time, (hrs.) | Initiator, grams, K₂S₂O₈ | Yield, percent | Polymer composition weight percent MVP |
|---|---|---|---|---|---|
| MVP | VAc | | | | |
| 50 | 50 | 5 | 2.7 | 50 | 85 |
| 24 | 69 | 6 | 4.9 | 26 | 55 |
| 50 | 50 | 18 | 6.2 | 46 | 81 |
| 80 | 28 | 18 | 5.9 | 58 | 83 |
| 95 | 17 | 18 | 4.8 | 61 | -- |

EXAMPLE 2

Hydrolysis of MVP/VAc copolymer

A solution of sodium methoxide in methanol was prepared by adding 2.0 g. of sodium to 250 ml. of methanol. The MVP/VAc (82/18) copolymer sample prepared as described in Example 1 was dissolved in 250 ml. of methanol and the solution was added to the sodium methoxide solution. The resulting mixture was refluxed for 4 hours and then cooled and allowed to stand overnight. The solution was then evaporated to about one-half its original volume and was added to 6 l. of water to precipitate the polymer. The product was dried overnight at 60° C. under vacuum, ground up in a blender using heptane as a support liquid and was redried at 60° C. in a vacuum. There was obtained 36.6 g. of a MVP/vinyl alcohol (VA) copolymer. Elemental analysis showed the product contained 10.65% nitrogen, which corresponds to 90.5 percent by weight of MVP. An infrared spectrum indicated that the carbonyl band at 5.7–5.8 present in the MVP/VAc starting material had completely disappeared.

Following the procedure described in Example 2, additional MVP/VAc copolymers were prepared as reported in Table II.

TABLE II

[2-methyl-5-vinylpyridine (MVP)/vinyl alcohol (VA) copolymers]

| Starting material | Catalyst¹ concentration (mol/l.) | Yield, percent |
|---|---|---|
| MVP/VAc (80/20) copolymer | 0.22 | 73 |
| MVP/VAc (47/53) copolymer | 0.17 | 56 |
| MVP/VAc (75/25) copolymer | 0.23 | 98 |

¹ The reactions were run in methanol using sodium methoxide as catalyst. The polymer concentration was generally 10%.

EXAMPLE 3

Incorporating of dyesites in polypropylene 3 g. of a dyesite copolymer, 0.2 g. of tetra-[3-(3,5-di-t-butyl-4-hydroxyphenyl) propionyl oxymethyl] methane, and 0.5 g. of 2-(2′-hydroxy - 3′,5′ - di-t-butyl-phenyl)-5-chloro-1,2,3-benzotriazole were dissolved in methylene chloride. The solution of said additives was blended with 100 g. of polypropylene and the solvent removed by placing polypropylene in a vacuum oven at room temperature overnight with a slight air bleed.

The dried mixture was thoroughly dispersed by melt mixing for 5 minutes on a two roll plastics mill at 180° C.

Preparation of fibers

A 5 g. portion of the milled sheet was spun into 3 mil (nominal) diameter fiber at 250° C. using an Extrusion Plastometer, and the standard orifice for determining the melt index for resins (62.5 mil diameter). The molten extrudate was pulled off at a constant speed by means of a set of heated Godet rolls (79° C.) and oriented 4:1 by means of a second set of Godet rolls operating at four times the peripheral speed of the first set.

Preparation of 5 mil films

Portions of the milled sheet were compression molded at 218° C. using contact pressure for 5 min. followed by 175 p.s.i. for 5 minutes. The samples were cooled under pressure in a separate water-cooled press.

EXAMPLE 4

Dyeing procedure with disperse dyes

Fibre samples as prepared in Example 3 using the MVP/VAc copolymer (89/11) as the dyesite were prescoured 15 min. at 160° F. in a solution containing 0.5% based on the weight of the fiber (OWF) of sodium carbonate and 0.5% OWF of octyl phenoxy polyethoxy ethanol (Triton X–100) at bath:fiber ratio of 30:1 and were then rinsed three times with distilled water. The samples were dyed in an Atlas Launderometer for 1.5 hrs. at 212° F. following a 30 min. heating period from 125° F. using 2% OWF Setacyl Scarlet P–GBL, 1% OWF Eriopon-H and 6.0% OWF ammonium sulfate (pH of ammonium sulfate solution adjusted to 6 with formic acid) and a bath:fiber ratio of 30:1. The samples were then after-scoured for 15 min. at 130° F. in a solution containing 2% OWF of a fatty acid-alkanolamine condensate (Eriopon-H) using a bath:fiber ratio of 30:1. The resulting fibers were dyed uniformly and of good yield in relation to the amount of the dye used. Excellent dyeability was also obtained when films were used in place of fibers.

EXAMPLE 5

Dyeing procedure with acid dyes

Fibre samples as prepared in Example 3 using MVP/VA copolymer (89/11) as the dyesite were pretreated with glacial acetic acid for 10 min. at 140° F. followed by four vigorous rinses with distilled water. The samples were prescoured for 15 min. at 160° F. in a solution containing 0.5% OWF sodium carbonate and 1.0% octyl phenoxy polyethoxy ethanol (Triton X–100) at a bath:fiber ratio of 30:1 and were then rinsed three times with distilled water. The samples were dyed in an Atlas Launderometer for 1.5 hrs. at 212° F. following a 30 min. heating period from 115° F. using a 2% OWF Polar Red RS solution containing 4.0% OWF acetic acid and 0.5% OWF alcohol ether sodium sulfate (Dupanol RA) and a bath:fiber ratio of 30:1. The samples were after-scoured for 20 min. at 160° F. in a solution containing 2% OWF of a fatty acid-alkanolamine condensate (Eriopon-H) at a bath:fiber ratio of 30:1. The resulting fibers dyed well. Good dyeability was also obtained when films were used in place of fibers.

EXAMPLE 6

Dyeing procedure with premetallized dyes

Fibre samples as prepared in Example 3 using MVP/VAc copolymer (89/11) as the dyesite were preheated with glacial acetic acid for 10 min. at 140° F. followed by four vigorous rinses with distilled water. The samples were prescoured 15 min. at 160° F. in a solution containing 0.5% OWF sodium carbonate and 1.0% octyl phenoxy polyethoxy ethanol (Triton X–100) at a bath:fiber ratio of 30:1 and were then rinsed three times with distilled water. The samples were dyed in an Atlas Launderometer for 15 hrs. at 212° F. following a 30 min. heating period from 115° F. using a 2% OWF dye Irgalan Red 4GL solution containing 4.0% OWF acetic acid and 0.5% OWF alcohol ether sodium sulfate (Dupanol RA) and a bath:fiber ratio of 30:1. The samples were after-scoured for 20 min. at 160° F. in a solution containing 2% OWF of a fatty acid-alkanolamine condensate (Eriopon-H) at a bath:fiber ratio of 30:1. The resulting fibers were dyed uniformly and of good yield in relation to the amount of the dye used. Good dyeability was also obtained when films were used in place of fibers.

EXAMPLE 7

Dyeing procedure with disperse dyes

Fibre samples as prepared in Example 3 using MVP/VA copolymer (89/11) as the dyesite were prescoured 15 min. at 160° F. in a solution containing 0.5% OWF sodium carbonate and 0.5% OWF octyl phenoxy polyethoxy ethanol (Triton X–100) at a bath:fiber ratio of 30:1 and were then rinsed three times. The samples were dyed in an Atlas Launderometer for 1.5 hrs. at 212° F. following a 30 min. heating period from 125° F. using 2% OWF Setacyl Scarlet P-GBL, 1% OWF Eriopon-H and 6.0% OWF ammonium sulfate (pH of ammonium sulfate adjusted to 6 with formic acid) and a bath:fiber ratio of 30:1. The samples were then after-scoured for 15 min. at 130° F. in a solution containing 2% OWF of a fatty acid-alkanolamine condensate (Eriopon-H) using a bath:fiber ratio of 30:1. The resulting fibers were dyed uniformly and of good yield in relation to the amount of dye used. Excellent dyeability was also obtained when films were used in place of fibers.

EXAMPLE 8

Dyeing procedure with acid

Fibre samples as prepared in Example 3 using a MVP/VA copolymer (89/11) as the dyesite were pretreated with glacial acetic acid for 10 min. at 140° F. followed by four vigorous rinses with distilled water. The samples were prescoured for 15 min. at 160° F. in a solution containing 0.5% OWF sodium carbonate and 1.0% Triton X–100 at a bath:fiber ratio of 30:1 and were then rinsed three times. The samples were dyed in an Atlas Launderometer for 15 hrs. at 212° F. following a 30 min. heating period from 115° F. using a 2% OWF Polar Red RS solution containing 4.0% OWF acetic acid and 0.5% OWF alcohol ether sodium sulfate (Dupanol RA) and a bath:fiber ratio of 30:1. The samples were after-scoured 20 min. at 160° F. in a solution containing 2% OWF of a fatty acid-alkanolamine condensate (Eriopon-H) at a bath:fiber ratio of 30:1. The resulting fibers were dyed uniformly and of good yield in relation to the amount of the dye used. Good dyeability was also obtained when films were used in place of fibers.

EXAMPLE 9

Dyeing procedure with premetallized dyes

Fibre samples as prepared in Example 3 using a MVP/VA copolymer (89/11) as the dyesite were pretreated with glacial acetic acid for 10 min. at 140° F. followed by four vigorous rinses with distilled water. The samples were prescoured for 15 min. at 160° F. in a solution containing 0.5% OWF sodium carbonate and 1.0% OWF octyl phenoxy polyethoxy ethanol (Triton X–100) at bath:fiber ratio of 30:1 and were then rinsed three times with distilled water. The samples were dyed in an Atlas Launderometer for 15 hrs. at 212° F. following a 30 min. heating period from 115° F. using a 2% OWF Irgalan Red 4GL solution containing 4.0% OWF acetic acid and 0.5% OWF alcohol ether sodium sulfate (Dupanol RA) and a bath:fiber ratio of 30:1. The samples were after-scoured 20 min. at 160° F. in a solution containing 2% OWF of a fatty acid-alkanolamine condensate (Eriopon-H) at a bath:fiber ratio of 30:1. The resulting fibers were dyed uniformly and of good yield in relation to the amount of the dye used. Good dyeability was also obtained when films were used in place of fibers.

EXAMPLE 10

The copolymers of 2-vinyl pyridine and vinyl acetate and 2-vinyl pyridine and vinyl alcohol are prepared according to the procedure described in Examples 1 and 2. These polymers are then employed in dyeing polypropylene fibers and films as described in Examples 4, 5 and 6.

What is claimed is:

1. A composition of matter comprising polypropylene and from 1 to 15 percent by weight of a copolymer consisting essentially of from 50 to 95 percent by weight of 2-methyl-5-vinylpyridine and from 5 to 50 percent by weight of vinyl alcohol.

2. A composition according to claim 1 comprising 3 to 10% by weight of a copolymer of 2-methyl-5-vinylpyridine and vinyl alcohol.

3. A composition according to claim 1 wherein said polypropylene is in a form of a film.

4. A composition according to claim 1 wherein said polypropylene is in a form of a fiber.

References Cited

UNITED STATES PATENTS 3,226,455    12/1965    Matsubayashi et al. __ 260—895
3,439,066    4/1969     Coover et al. _____ 260—895

SAMUEL H. BLECH, Primary Examiner

U.S. Cl. X.R.

8—180; 260—41 C, 45.7 P, 45.7 PS, 45.75 N, 45.8 N, 45.85, 45.95, 80.3 R, 85.7; 264—210